United States Patent
Golea et al.

[11] Patent Number: 5,090,519
[45] Date of Patent: Feb. 25, 1992

[54] DISK BRAKE FOR VEHICLES

[75] Inventors: Filip Golea, Munich; Xaver Wirth, Ismaning, both of Fed. Rep. of Germany

[73] Assignee: Knorr-Bremse AG, Munich, Fed. Rep. of Germany

[21] Appl. No.: 527,562

[22] Filed: May 23, 1990

[30] Foreign Application Priority Data

May 23, 1989 [DE] Fed. Rep. of Germany ....... 3916741

[51] Int. Cl.$^5$ .......................................... F16D 55/225
[52] U.S. Cl. ..................................... 188/72.6; 92/256; 188/72.4; 188/73.37; 188/370; 403/291
[58] Field of Search .................... 188/72.2, 72.4, 72.5, 188/72.6, 73.36, 73.37, 369, 370; 403/291; 92/129, 256

[56] References Cited

U.S. PATENT DOCUMENTS

| 3,095,064 | 6/1963 | Tankersley et al. | 188/72.4 X |
| 3,112,014 | 11/1963 | Jeffries | 188/72.5 X |
| 3,186,518 | 6/1965 | Rodway | 188/72.4 |
| 3,390,744 | 7/1968 | Fawick | 188/72.2 |
| 3,498,418 | 3/1970 | Dewar | 188/72.4 X |
| 3,722,634 | 3/1973 | Ogasawara et al. | 188/72.4 X |
| 3,890,884 | 6/1975 | Silberschlag | 188/72.4 X |
| 4,019,426 | 4/1977 | Wosegien et al. | 92/129 X |
| 4,055,238 | 10/1977 | Haraikawa et al. | 92/129 X |
| 4,066,153 | 1/1978 | Plentz | 92/129 X |
| 4,375,250 | 3/1983 | Burgdorf | 188/72.2 |

FOREIGN PATENT DOCUMENTS

| 3015838 | 10/1981 | Fed. Rep. of Germany | 188/72.2 |
| 3544475 | 6/1987 | Fed. Rep. of Germany | 188/370 |
| 1390274 | 1/1965 | France | 188/72.2 |
| 265057 | 11/1987 | Japan | 188/370 |

Primary Examiner—George E. A. Halvosa
Attorney, Agent, or Firm—Pollock, Vande Sande & Priddy

[57] ABSTRACT

In a disk brake actuated preferably hydraulically, a piston (5) is guided within a housing located in a caliper. When pressure is applied, the piston acts in such a manner against a brake shoe (15) bearing a brake lining (17) that the brake shoe (15) is pressed with its brake lining against the brake disk to be braked. The side of the piston facing the brake shoe has a pressure plate (13) which transmits the pressure forces and which moves transversely within its recess in the piston (5). The pressure plate (13) is mounted on the end of a tappet (25) extending axially inside the piston (5) and bracing itself at the end opposite the pressure plate by a disk (27) at the bottom (29) of the bore (31) accommodating the tappet, and is surrounded by a prestressed compression spring (37). Lateral movements of the pressure plate (13) cause tipping of the tappet (25) and, as a consequence thereof, a reset force exerted by the compression spring (37) on the tappet (25) and, thus, on the pressure plate (13). This reset force can be precisely defined by use of a threaded ring (39) whose position can be changed and which braces one end of the compression spring (37).

5 Claims, 1 Drawing Sheet

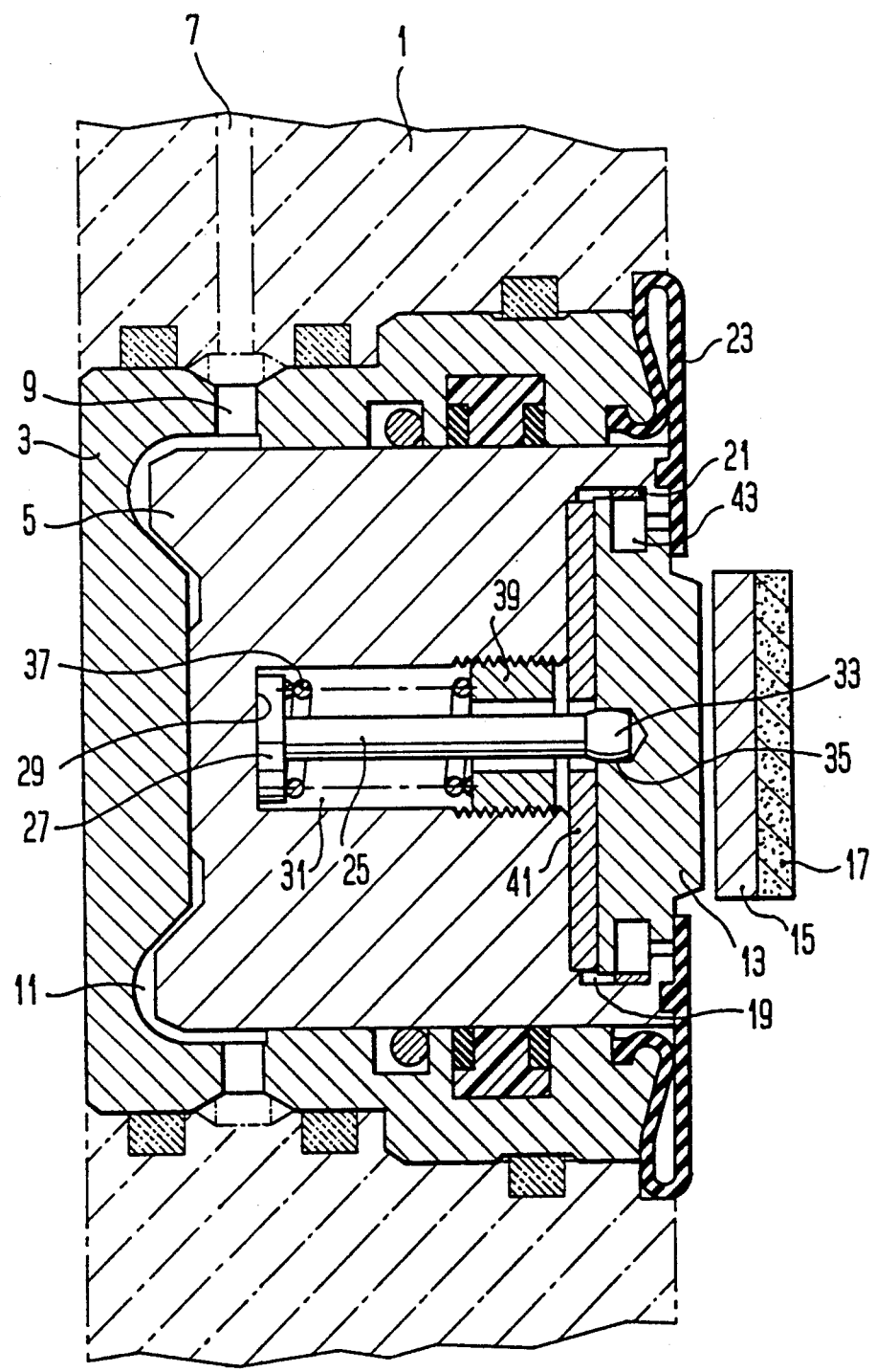

DISK BRAKE FOR VEHICLES

FIELD OF THE INVENTION

The invention relates to a disk brake.

BACKGROUND OF THE INVENTION

Disk brakes system for rail and commercial vehicles that can be actuated by pressure medium exhibit in their design as caliper constructions a piston that is guided pressure-tight in a housing or in the caliper construction and can be actuated by hydraulic or pneumatic pressure medium and that acts relative to a brake shoe when actuated, in order to force said brake shoe with its brake lining against a brake disk to be braked. Linings that make contact by such working pistons in calipers make small transverse movements due to their bearing play; thus, a transverse force, which corresponds to the product of the piston force and the coefficient of friction (back of lining/piston), is impressed on the piston.

Laterally movable pressure plates, which are integrated into the piston face, reduce these transverse forces in proportion to the coefficients of friction; the pressure plates can be positioned with little friction and carry out lateral movements within predetermined limits against the resistance of the lateral spring elements, when the brake disk is engaged. When the brake is released, the elastic return elements return the pressure plate with a force that is proportional to their deflection. The drawback of such arrangements is that the friction, caused, among other things, by seals, prevents a return of the pressure plate to the zero value. The residual deflection of the pressure plate prevents the displaceability upon subsequent braking and leads, furthermore, to a disproportionately high lateral migration, when braking is in the opposite direction of rotation.

SUMMARY OF THE INVENTION

The object of the invention is a disk brake of the aforementioned kind, in which the pressure plate always returns with absolute reliability to zero or starting position independently of the amount of transverse movement. The return or reset force of the pressure plate should be adaptable preferably to the respective existing operating conditions. Simultaneously, the design provided to this end has a simple construction without negative impact on the dimensions of the disk brake system.

The pressure plate, which can be fastened with the aid of a simple retainer ring at the piston, can be returned with absolute certainty to zero position with the aid of a spring mechanism, since the reset force is not a function of the amount of lateral deflection relative, e.g., to the elastic reset and sealing elements that are located on the periphery and whose function could also be influenced by friction and temperature. The tappet located inside the piston, with an associated reset or pressure spring, functions with absolute reliability since the pre-stressing of the compression spring can be set without additional effort with the aid of the threaded ring; thus, the reset force can be adjusted to the respective operating conditions. The spring mechanism is integrated into the interior of the piston in such a manner that the design benefits, and, after removal of the pressure plate, said spring mechanism can be accessed from the outside, in order to adjust the threaded ring, if necessary. The pressure plate itself can be snapped in at the piston with the aid of the retainer ring, i.e., held such that it cannot be lost, and can also be taken off again in a simple manner.

BRIEF DESCRIPTION OF THE DRAWING

The invention is explained below with reference to the embodiment shown in the attached drawing. The drawing is a partial view of a disk brake system of the invention.

DESCRIPTION OF PREFERRED EMBODIMENT

The single drawing figure is a partial view of a caliper 1 of a disk brake that can be actuated preferably hydraulically; a housing 3 in which there is a movable piston 5 is positioned in caliper 1. Hydraulic pressure medium is introduced into pressure chamber 11 via conduit 7, indicated in caliper 1, and a bore 9, located in housing 3, in such a manner that piston 5 can be moved toward the right. When pressure chamber 11 is relieved of pressure, piston 5 can be returned into its illustrated starting position by means of devices (not shown).

Piston 5 acts, via a pressure plate 13 located on its front side, on a brake shoe 15, which, in the conventional manner, forces the brake lining 17 against a brake disk (not shown). Pressure plate 13 is installed in a recess 19 of piston 5 by means of a retainer ring 21, with bellows 23 preferably sealing the annulus between pressure plate 13 and piston 5 and also the gap between piston 5 and housing 3. Inside piston 5 is a tappet 25 with disk 27 that has a relatively large surface on its left-hand end (as seen in the drawing) and which, in its illustrated starting position, rests at an angle against the bottom 29 of bore 31, accommodating the tappet. The right-hand end, as seen in the drawing, of tappet 25 is guided with its tappet head 33, preferably of spherical shape, into a recess 35 of pressure plate 13. The tappet is enclosed by a compression spring 37, which abuts against disk 27 and against a threaded ring 39, serving to generate pre-stress. Between piston 5 and pressure plate 13 is a sliding plate 41 made of a material, which opposes slight frictional resistance to the facing side of pressure plate 13.

Retainer ring 21, serving to fasten pressure plate 13, has an oval configuration, i.e., it abuts with its large diameter the undercut of piston 5, and it can abut with its small diameter (not illustrated) the inner diameter of a slot 43 in the pressure plate. In this manner pressure plate 13 is reliably retained within the recess 19, but it can be lifted out in a simple manner when retainer ring 21 is pre-stressed in a circular shape by means of a tool introduced through the annulus between pressure plate and housing. Other quick disconnect means can also be provided by which the pressure plate is retained at piston 5. It is also possible to provide tappet head 33 with a pivatable threaded member on which a corresponding internal thread of the pressure plate can be screwed.

The operation of the above described arrangement is as follows.

When piston 5 is moved hydraulically in the direction of the brake disk and brake lining 17 is pressed against the brake disk, brake shoe 15 is carried along in the circumferential direction (relative to the brake disk) in such a manner that pressure plate 13, forced against brake shoe 15, is in turn moved sideways within the free space existing in piston 5, e.g., in the drawing upwardly. This lateral displacement causes corresponding tilting of tappet 25 and subsequently to a corresponding tilting and one-sided stressing of compression spring 37, which tends to return the tappet to its parallel position within bore 31. Upon release of pressure plate 13, i.e., upon release of the brake, the reset force of compression spring 37 and, thus, tappet 25, takes effect, thus returning the pressure plate into the neutral starting position. Thus, up to the starting or zero position, the tappet has a defined reset force, formed by the axial stressing of compression spring 37. The defined reset force can be set with precision, as described above, by use of threaded ring 39.

What is claimed is:

1. Vehicle disk brake comprising a piston (5) disposed in a housing and acting on a brake shoe (15) bearing a brake lining (17), said brake comprising
   (a) a laterally movable pressure plate (13) located on a side of said piston facing said brake shoe and comprising a recess (35) in a side of said pressure plate facing said piston;
   (b) spring means of predetermined spring force for returning said pressure plate upon brake release from a laterally deflected position, resulting from brake actuation, to a neutral starting position, said spring means comprising
      (i) a bore (31) extending axially in the piston
      (ii) a disk (27) braced against an end (29) of said bore remote from said pressure plate;
      (iii) a tappet (25) having a first end connected to said disk (27) and extending at a distance from an inner wall of said bore (31), said tappet having a tappet head (33) located at a second end remote from said disk (27) and accommodated in said recess (35) in said pressure plate, said tappet head corresponding in shape to said recess to enable guidance of said tapper;
      (iv) a threaded ring (39) screwed into said bore (31) at an end of said bore remote from said disk (27);
      (v) a compression spring (37) surrounding said tappet (25) and having a first end braced against said disk (27) and a second end braced against said threaded ring (39);
      (vi) said tappet (25) axially traversing said threaded ring (39) with clearance, such as to permit a predetermined amount of tilting of said tappet causing one-sided stressing of said compression spring (37) and subsequent return of said tappet to zero position aligned with said bore (31).

2. Disk brake according to claim 1, wherein said threaded ring (39) is adapted to be screwed so as to adjust its position, within a thread of said bore (31), in order to change a pre-stress of said compression spring (37).

3. Disk brake according to claim 1, comprising a sliding plate (41) having a low coefficient of friction and being located between a face of said piston (5) facing said pressure plate (13) and said pressure plate (13) itself, in such a manner that said pressure plate (13) can be moved laterally on and relative to said sliding plate (41) and can be guided into the zero position by said spring means.

4. Disk brake according to claim 1, comprising
   (a) a groove (43) on an outer periphery of said pressure plate (13);
   (b) in the region of a recess (19) in said piston accommodating said pressure plate (13), a groove-shaped undercut in said piston (5) opposite said groove (43);
   (c) for rapid assembly and disassembly of said pressure plate, an oval retainer ring (21) located in said groove (43), in such a manner that a large diameter of said retainer ring abuts an inner wall of said groove-shaped undercut of said piston and a small diameter of said ring abuts an inner diameter of said groove (43).

5. Disk brake according to claim 4, wherein said retainer ring (21) is adapted to be compressed into annular shape by tool means and to be lifted out of said groove-shaped undercut or groove (43).

* * * * *